Nov. 7, 1950          E. E. SHONTZ          2,528,795
SELF-CONTAINED PORTABLE ICE PLANT
Filed April 23, 1949          3 Sheets-Sheet 1
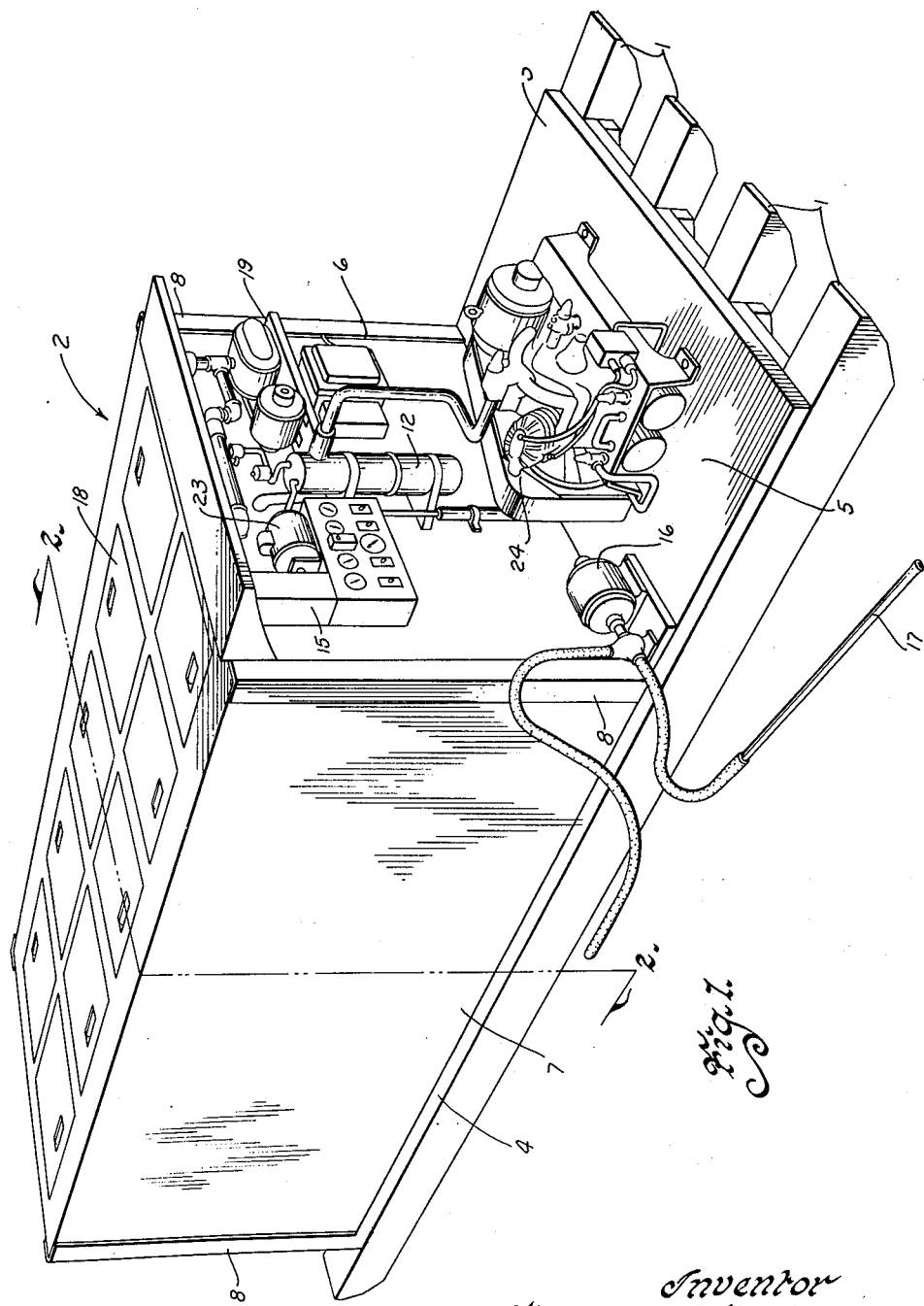
Inventor
Ellsworth E. Shontz
By Harry L. Yunger
Attorney
Witness
Edward P. Seeley

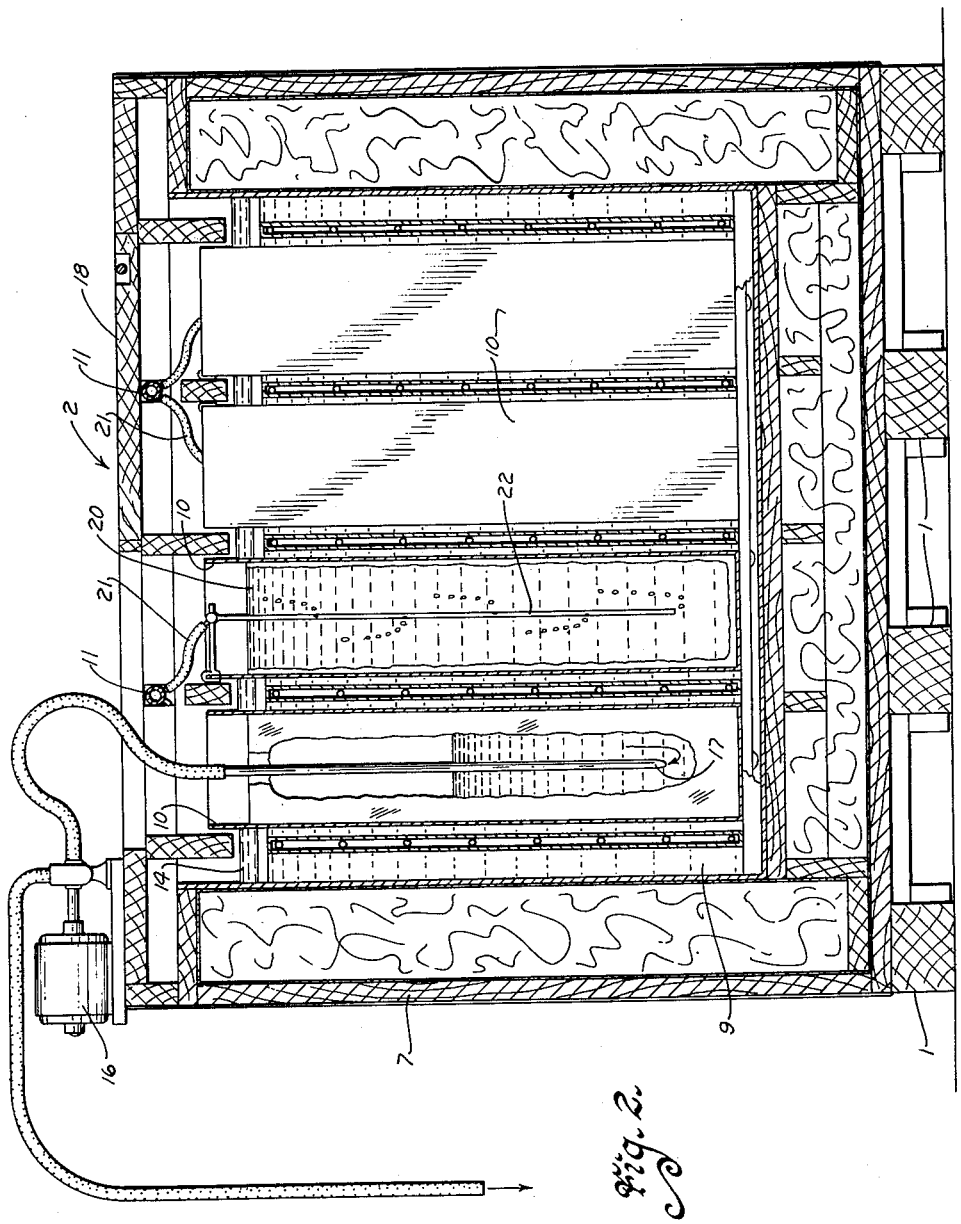

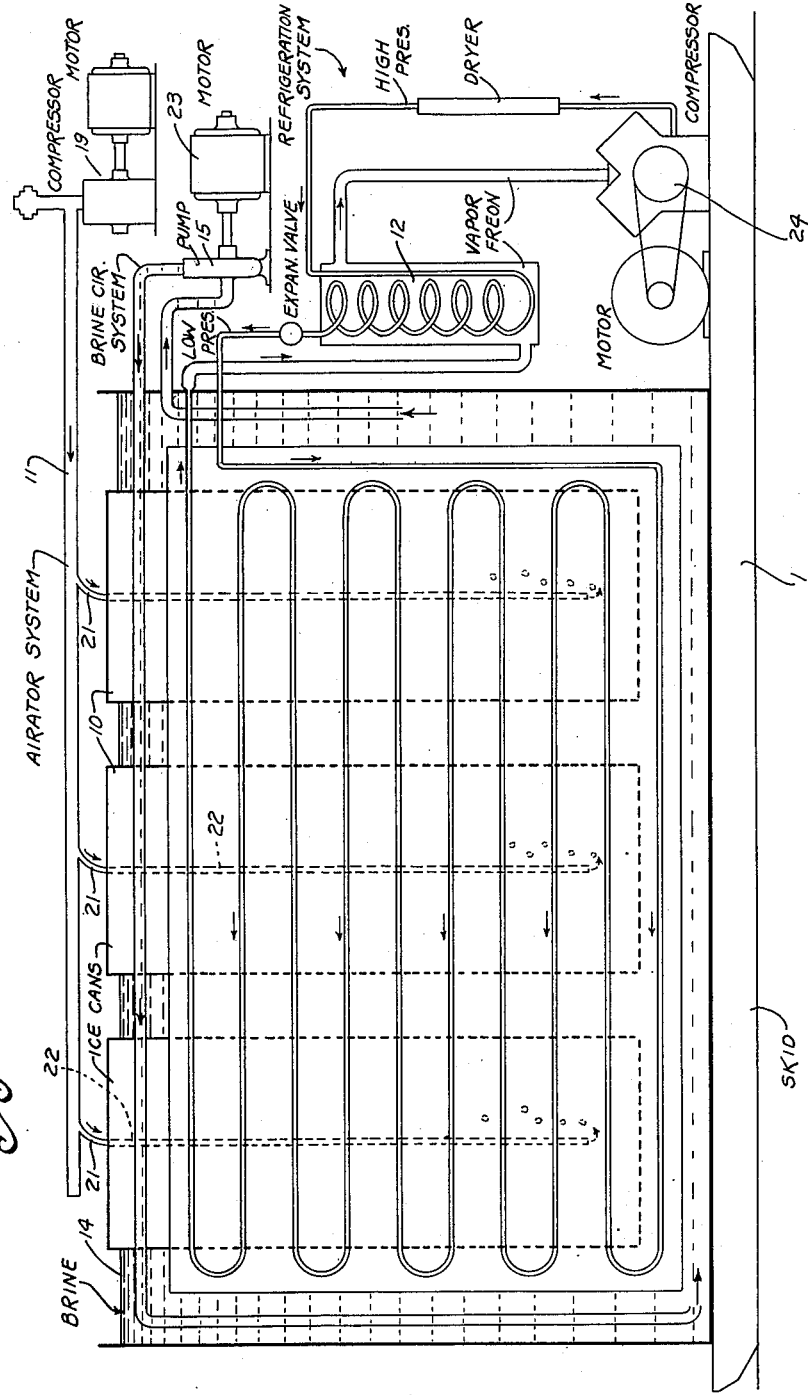

Patented Nov. 7, 1950

2,528,795

UNITED STATES PATENT OFFICE 2,528,795

SELF-CONTAINED PORTABLE ICE PLANT

Ellsworth E. Shontz, Des Moines, Iowa, assignor to Hugo D. Polachek, Des Moines, Iowa Application April 23, 1949, Serial No. 89,300

1 Claim. (Cl. 62—105)

This invention relates to a new and novel self contained portable ice making plant and more particularly to an ice making plant that can be moved from place to place for ice making so as to be a piece of personal property instead of part of the real estate.

In the manufacture of ice into cakes in large commercial ice plants, the ice is frozen into cakes by a refrigeration and brine system, the water is aerated, and the core is removed from the cake of ice being formed. The commercial plant is a large enterprise and serves usually an area fifty or more miles in diameter. This means that dealers in ice must travel long distances to and from the plant, consuming time and allowing the ice to melt enroute. The commercial stationary plant is expensive to build and does not always justify the investment of building in some instances. Many advantages are present in a portable self contained ice making plant and it is with this problem that the present invention is involved.

It is an object of the invention to provide an ice making plant that is portable and all the working parts are contained within the plant.

It is another object of the invention to provide a self-contained portable ice making plant that is completely assembled in a portable structure, ready to be set in place for operation and fully assembled for operation.

It is still another object of the invention to provide a self-contained portable ice making plant that is operable by one man after the ice-making plant is located in place for operation.

It is a further object of the invention to provide a self-contained portable ice making plant that is the answer to the local ice service problem in a thousand communities; ideal for hotels, hospitals and other large institutions; the perfect answer to the individual or company now rendering costly ice service to small towns; and it eliminates waste, loss, saves time and makes ice making more profitable.

It is still a further object of the invention to provide a self-contained portable ice making plant providing the only movable, self contained ice making plant manufacturing standard 300 pound cakes, automatically aerated to produce crystal clear ice and also has self contained brine agitator assuring constant and even temperature.

It is still a further object of the invention to provide a self-contained portable ice making plant simple in construction and operation, easy to operate and economical both in construction and operation; an ice plant long lasting and durable in operation; an ice plant easy to operate, simple in design and easy of repair in case of breakdown; and an ice plant that can be supplied at an economical price.

With the foregoing and other objects in view, the invention will be more fully described herewith and will be particularly pointed out in the claims appended hereto.

In the drawings wherein like symbols refer to like or corresponding parts throughout the several views:

Figure 1 is an elevational view of the portable self contained ice plant from the front and one side.

Figure 2 is a sectional view through the line 2—2 of Figure 1.

Figure 3 is a schematic view of the working parts in the ice making machine.

The ice plants are made in one, three and five ton capacity and each has a base portion mounted on skids. The skid members 1 extend across the length of the ice plant 2 and in the five ton capacity are 25 feet long; in three ton capacity are nineteen feet long and in the one ton model are fifteen feet long. The skids 1 support the ice plant 2 so that it has support in tension to be moved from place to place as a unit. The skids 1 are covered over by cross-members 3 to form a platform to support parts of the ice plant 2.

In the manufacture of ice, the machinery has always been so cumbersome and large that it has always been desirable to build a permanent plant to manufacture ice. The expense of building a plant more or less limits the number of plants built and their location, hence the ice plants are never placed in the most desirable place for location. This greatly increases the cost of supplying ice to locations distant from the plant. If ice plants can be assembled from parts already prefabricated, they are economical and their large size makes very little difference in handling.

In the manufacture of the portable self-contained ice plant, the base portion 4 is built up first with the cross-pieces 3 and the ice plant 2 mounted on top of the base portion 4. The base portion 4 is made longer than the ice plant 2 and a ledge 5 is left beyond the end 6 of the ice plant 2. The end of the ice plant 6 and the ledge 5 receive working parts of the ice plant 2.

The ice plant 2 is built up of an outer case, best shown in Figure 2, at 7 of two inch seasoned high grade lumber protected at the corners with heavy steel 8. Between the outer case 7 and an inner tank 9 is the finest double thick insulation of K25 balsam wood to protect the ice cakes being made from the heat. The inner tank 9 is of galvanized steel. All the joints of the tank 9 are double welded and the tank is treated inside and out to protect against rust, brine and corrosion. The inside of the tank 9 is made so as to receive ice cans 10 which are standard galvanized steel of first material and welded construction. The ice cans 10 are just filled with untreated water as it comes from the faucet and during the freezing of the water into ice cakes an aerator system, shown at 11, puts air into the water being frozen to remove any air remaining in the water and impurities from the water assuring crystal clearness.

The ice making plant 2 is in heat exchange relation with a standard compression expansion system 12 adopted to be serviced from the edge of the base portion. The refrigerating system 12 is connected with a compressor system 13 through a closed system and the refrigerant is circulated through the compressor to be compressed and cooled and then through a brine system 14 in the ice plant. A pump 15 forces the brine through the ice plant 2 in heat exchange relationship with the refrigerant, picking up from the refrigerant, heat of the water and returning the Freon to the compressor 12.

As the water freezes in the ice can 10, impurities drop out of the water and it is desirable to remove the impurities from the water which is termed as removing the core. A pump 16 is shown which has a nozzle 17 fitting into the ice can 10 and draws out the water that contains impurities. When the water containing impurities has all been withdrawn, the ice can 10 is again filled with fresh water and the ice proceeds through to completion turning out as a crystal clear cake. The covers 18 are made of heavy, seasoned, high grade wood; with each cover covering two cans. The control panel 19 which includes all switches and gauges and controls are all located on this panel 19 assuring maximum convenience.

Figure 1 shows the ice plant all assembled and ready to be moved to a point of operation. The ice plant can be skidded into place on trucks with the tools available for this purpose and transported to place of use. When placed in operation, all machine parts are mounted on the plant in operable relation and the ice plant is ready to operate with only one man in attendance. All switches and everything necessary to handle is on the panel 19.

The covers 18 are removed and the ice cans 10 are filled with water 20 from the faucet from pipe line 21. The ice cans 10 fit into the inner tank 9 around the brine 15 and from the panel 19, the brine pump 15, the aerator system 11 is set into operation and the compressor 12 is set into operation. As shown in Figures 3 and 2 the aerator system 11 discharges through pipes 22 into the ice cans 12; the brine is circulated by motor 23 connected to pump 15 and the compressor 24 operates in a closed cycle in heat exchange relation with the brine. The core pump 16 is set into operation when the ice in the can 10 freezes part of the way. The water with impurities is removed from the ice cake by the pump 16 and then the cake refilled with water from the water line 20.

The ice can 10 is removed from the ice plant 2 when the ice is frozen and the ice cakes removed from the ice cans. An electric hoist may be employed to lift the ice cans and ice from the ice cans when completed.

It is to be understood that the form of my invention, hereafter shown and described, is to be taken as a preferred example of the same, and that various changes in the shape, size and arrangement of parts may be resorted to, without departing from the spirit of my invention, or the scope of the subjoined claim.

Having thus described my invention, I claim:

In a portable ice plant, a platform, skid members secured to the bottom of said platform; said skid members being spaced parallel to and equidistant from each other with the outside two skid members having their outside top edges coincident with the respective outside bottom edges of said platform, a body portion open at the top, comprising, an outer shell, a liquid tight interior, and insulation between the outer shell and interior; said body portion being shorter than said platform and mounted on it, rectangular cans open at one end in said body portion, lids for each pair of said cans, brine surrounding said cans, a means for circulating said brine, a refrigerating means for cooling said brine, an air compressor, tubes leading from said air compressor to the bottom interior of said cans, a water pump, and a conduit for operatively connecting the inside of said cans to said pump at times.

ELLSWORTH E. SHONTZ.

REFERENCES CITED

The following references are of record in the file of this patent:

UNITED STATES PATENTS

| Number | Name | Date |
|---|---|---|
| 239,666 | Palmer | Apr. 5, 1881 |
| 1,273,296 | West | July 23, 1918 |
| 2,005,733 | Field | June 25, 1935 |
| 2,005,735 | Field | June 25, 1935 |
| 2,099,898 | Larkin | Nov. 23, 1937 |
| 2,134,243 | Berger | Oct. 25, 1938 |